United States Patent
Shen et al.

(10) Patent No.: US 12,452,728 B2
(45) Date of Patent: Oct. 21, 2025

(54) CONGESTION CONTROL METHOD, APPARATUS, AND SYSTEM

(71) Applicant: Huawei Technologies Co., Ltd., Shenzhen (CN)

(72) Inventors: Xiaoman Shen, Nanjing (CN); Wei Zhang, Nanjing (CN); Hongyi Tan, Suzhou (CN); Rihai Wu, Suzhou (CN); Xingfeng Jiang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 518 days.

(21) Appl. No.: 17/859,431

(22) Filed: Jul. 7, 2022

(65) Prior Publication Data

US 2023/0013180 A1    Jan. 19, 2023

(30) Foreign Application Priority Data

Jul. 8, 2021 (CN) .......................... 202110772818.5
Jul. 9, 2021 (CN) .......................... 202110774805.1
Sep. 7, 2021 (CN) .......................... 202111044369.9
Sep. 7, 2021 (CN) .......................... 202111044378.8

(51) Int. Cl.
H04W 28/02    (2009.01)
H04L 47/27    (2022.01)

(52) U.S. Cl.
CPC ......... H04W 28/0273 (2013.01); H04L 47/27 (2013.01)

(58) Field of Classification Search
None
See application file for complete search history.

(56) References Cited

U.S. PATENT DOCUMENTS

| | | | |
|---|---|---|---|
| 11,330,460 B1* | 5/2022 | Ahmed | H04W 74/0816 |
| 2009/0163223 A1 | 6/2009 | Casey | |
| 2015/0172996 A1* | 6/2015 | Park | H04W 48/06 370/230 |
| 2016/0366637 A1* | 12/2016 | Barriac | H04W 76/10 |
| 2018/0205656 A1 | 7/2018 | Atli et al. | |
| 2019/0132848 A1 | 5/2019 | Ansley | |
| 2021/0105659 A1 | 4/2021 | Li et al. | |
| 2021/0144778 A1 | 5/2021 | Cherian et al. | |
| 2022/0201756 A1* | 6/2022 | Xin | H04W 74/0816 |
| 2023/0247684 A1* | 8/2023 | Lu | H04W 74/0866 370/329 |
| 2024/0098712 A1* | 3/2024 | Chitrakar | H04W 72/0446 |

FOREIGN PATENT DOCUMENTS

WO    2021041424 A1    3/2021

* cited by examiner

*Primary Examiner* — Saumit Shah
(74) *Attorney, Agent, or Firm* — Conley Rose, P.C.

(57) ABSTRACT

A congestion control method includes that a first access point receives a first indication from a second access point; and the first access point performs traffic control on a non-key service of the first access point based on the first indication. The first access point is a neighboring access point of the second access point, and an operating channel of the first access point and an operating channel of the second access point overlap.

20 Claims, 6 Drawing Sheets

CONGESTION CONTROL METHOD, APPARATUS, AND SYSTEM

CROSS-REFERENCE TO RELATED APPLICATION

This application claims priority to Chinese Patent Application No. 202110772818.5 filed on Jul. 8, 2021, Chinese Patent Application No. 202110774805.1 filed on Jul. 9, 2021, Chinese Patent Application No. 202111044369.9 filed on Sep. 7, 2021, and Chinese Patent Application No. 202111044378.8 filed on Sep. 7, 2021. The aforementioned patent applications are hereby incorporated by reference in their entireties.

TECHNICAL FIELD

This application relates to the field of communications technologies, and in particular, to a congestion control method, apparatus, and system.

BACKGROUND

A wireless local area network (WLAN) includes an access point (AP) and a station (STA). The AP is configured to provide a network access service for a STA associated with the AP. To prevent APs from affecting each other, operating channels of APs that are relatively close to each other are usually deployed in a staggered manner (that is, the operating channels of the APs that are relatively close to each other do not overlap).

However, in a scenario in which APs are densely distributed, operating channels of APs that are relatively close to each other inevitably overlap. How to coordinate the APs whose operating channels overlap is an urgent problem to be resolved.

SUMMARY

This application provides a congestion control method, apparatus, and system. The technical solutions in this application are as follows.

According to a first aspect, a congestion control method is provided, where the method includes that a first access point receives a first indication from a second access point, where the second access point is a neighboring access point of the first access point, and an operating channel of the first access point and an operating channel of the second access point overlap, and the first access point performs traffic control on a non-key service of the first access point based on the first indication.

In the technical solutions provided in this application, because the operating channel of the first access point and the operating channel of the second access point overlap, after the first access point performs traffic control on the non-key service of the first access point based on the first indication from the second access point, a service (for example, a key service) of the second access point and a key service of the first access point can use more channel resources. This helps improve quality of service (QoS) of the service of the second access point and QoS of the key service of the first access point. The second access point is a neighboring access point of the first access point, and the operating channel of the first access point and the operating channel of the second access point overlap. That is, the first access point and the second access point are neighboring access points deployed on a same frequency band. Therefore, collaborative work of intra-frequency neighboring access points is implemented in this application.

Optionally, that the first access point performs traffic control on a non-key service of the first access point includes that if the first indication is received and channel utilization of the non-key service of the first access point is higher than a control threshold, the first access point performs traffic control on the non-key service of the first access point.

According to the technical solutions provided in this application, when the first access point receives the first indication and the channel utilization of the non-key service of the first access point is higher than the control threshold, the first access point performs traffic control on the non-key service of the first access point, so that not only the QoS of the service of the second access point can be improved, but also the QoS of the key service of the first access point can be improved.

Optionally, that the first access point performs traffic control on a non-key service of the first access point includes that the first access point sends a modification indication to a station associated with the first access point, where the modification indication is used to indicate the station to modify an enhanced distributed channel access (EDCA) parameter of the non-key service. The EDCA parameter of the non-key service may represent a channel access probability of the non-key service. For example, the modification indication is used to indicate the station to modify the EDCA parameter of the non-key service, so as to reduce the channel access probability of the non-key service.

In the technical solutions provided in this application, because the EDCA parameter of the non-key service may represent the channel access probability of the non-key service, the first access point may indicate the station associated with the first access point to modify the EDCA parameter of the non-key service, to reduce the channel access probability of the non-key service, so as to implement traffic control on the non-key service.

Optionally, that a first access point receives a first indication from a second access point includes that the first access point receives a first beacon frame from the second access point, where the first beacon frame carries the first indication. That is, the second access point sends the first indication to the first access point by sending a beacon frame. The second access point may further send the first indication to the first access point in another wireless or wired manner.

Optionally, after the first access point performs traffic control on the non-key service of the first access point, the method further includes that the first access point receives a second indication from the second access point, and the first access point cancels traffic control on the non-key service of the first access point based on the second indication.

According to the technical solutions provided in this application, after the first access point performs traffic control on the non-key service of the first access point, the service (for example, the key service) of the second access point and the key service of the first access point can use more channel resources. This helps recover an affected service of the second access point and improve the QoS of the key service of the first access point. After the affected service of the second access point is recovered, the second access point may indicate the first access point to cancel traffic control on the non-key service of the first access point, and the first access point may cancel traffic control on the non-key service of the first access point based on the indication of the second access point. Therefore, when the QoS of the service of the second access point and the QoS of the key service of the first access point are improved, a throughput of the non-key service of the first access point may also be improved.

Optionally, that a first access point receives a second indication from a second access point includes that the first access point receives a second beacon frame from the second access point, where the second beacon frame carries the second indication. That is, the second access point sends the second indication to the first access point by sending a beacon frame. The second access point may further send the second indication to the first access point in another wireless or wired manner.

Optionally, a distance between the first access point and the second access point is less than a distance threshold. Because the distance between the first access point and the second access point is less than the distance threshold, the first access point and the second access point are neighbors to each other.

Optionally, that an operating channel of the first access point and an operating channel of the second access point overlap includes that at least one sub-channel of the operating channel of the first access point is the same as at least one sub-channel of the operating channel of the second access point. For example, the operating channel of the first access point is completely the same as the operating channel of the second access point, or some of the sub-operating channels of the operating channel of the first access point is the same as some of the sub-operating channels of the operating channel of the second access point.

According to a second aspect, a congestion control method is provided, where the method includes that a first access point sends a first indication to a second access point, where the first indication is used to indicate the second access point to perform traffic control on a non-key service of the second access point, the second access point is a neighboring access point of the first access point, and an operating channel of the first access point and an operating channel of the second access point overlap.

According to the technical solutions provided in this application, the first access point may send the first indication to the second access point to indicate the second access point to perform traffic control on the non-key service of the second access point. Because the operating channel of the first access point and the operating channel of the second access point overlap, after the second access point performs traffic control on the non-key service of the second access point, a service (for example, a key service) of the first access point and a key service of the second access point can use more channel resources. This helps improve QoS of the service of the first access point and QoS of the key service of the second access point. The second access point is a neighboring access point of the first access point, and the operating channel of the first access point and the operating channel of the second access point overlap. That is, the first access point and the second access point are neighboring access points deployed on a same frequency band. Therefore, collaborative work of intra-frequency neighboring access points is implemented in this application.

Optionally, that a first access point sends a first indication to a second access point includes that the first access point sends a first beacon frame to the second access point, where the first beacon frame carries the first indication. That is, the first access point sends the first indication to the second access point by sending a beacon frame. The first access point may further send the first indication to the second access point in another wireless or wired manner.

Optionally, that a first access point sends a first indication to a second access point includes that if utilization of the operating channel of the first access point is greater than a target threshold and the key service of the first access point is affected, the first access point sends the first indication to the second access point.

According to the technical solutions provided in this application, if the utilization of the operating channel of the first access point is greater than the target threshold and the key service of the first access point is affected, it is considered that air interface congestion occurs on the first access point. The first access point sends the first indication to the second access point when air interface congestion occurs on the first access point. Therefore, after the second access point performs traffic control on the non-key service of the second access point based on the first indication, air interface congestion on the first access point can be relieved. This helps recover the key service of the first access point.

Optionally, after the first access point sends the first indication to the second access point, the method further includes that the first access point sends a second indication to the second access point, where the second indication is used to indicate the second access point to cancel traffic control on the non-key service of the second access point.

According to the technical solutions provided in this application, because the operating channel of the first access point and the operating channel of the second access point overlap, after the second access point performs traffic control on the non-key service of the second access point, the service (for example, the key service) of the first access point and the key service of the second access point can use more channel resources. This helps recover an affected service of the first access point and improve the QoS of the key service of the second access point. Therefore, after the first access point sends the first indication to the second access point, the first access point may send the second indication to the second access point to indicate the second access point to cancel traffic control on the non-key service of the second access point. In this way, when the QoS of the service of the first access point and the QoS of the key service of the second access point are improved, a throughput of the non-key service of the second access point may also be improved.

Optionally, that a first access point sends a second indication to a second access point includes that the first access point sends a second beacon frame to the second access point, where the second beacon frame carries the second indication. That is, the first access point sends the second indication to the second access point by sending a beacon frame. The first access point may further send the second indication to the second access point in another wireless or wired manner.

Optionally, that a first access point sends a second indication to a second access point includes that if the key service of the first access point is recovered, the first access point sends the second indication to the second access point.

According to the technical solutions provided in this application, the first access point sends the second indication to the second access point when the key service of the first access point is recovered, so that when the QoS of the key service of the first access point is improved, the throughput of the non-key service of the second access point may also be improved.

Optionally, a distance between the first access point and the second access point is less than a distance threshold. Because the distance between the first access point and the second access point is less than the distance threshold, the first access point and the second access point are neighbors to each other.

Optionally, that an operating channel of the first access point and an operating channel of the second access point overlap includes that at least one sub-channel of the operating channel of the first access point is the same as at least one sub-channel of the operating channel of the second access point. For example, the operating channel of the first access point is completely the same as the operating channel of the second access point, or some of the sub-operating channels of the operating channel of the first access point is the same as some of the sub-operating channels of the operating channel of the second access point.

According to a third aspect, a congestion control apparatus is provided. The congestion control apparatus includes modules configured to perform the method provided in any one of the first aspect or the optional manners of the first aspect.

According to a fourth aspect, a congestion control apparatus is provided. The congestion control apparatus includes modules configured to perform the method provided in any one of the second aspect or the optional manners of the second aspect.

The modules in the third aspect or the fourth aspect may be implemented based on software, hardware, or a combination of software and hardware, and may be randomly combined or divided based on a specific implementation.

According to a fifth aspect, a congestion control apparatus is provided, including a processor, a memory, and a transceiver.

The transceiver is configured to perform sending and receiving actions in the method provided in any one of the first aspect or the optional manners of the first aspect, or perform sending and receiving actions in the method provided in any one of the second aspect or the optional manners of the second aspect.

The memory is configured to store a computer program.

The processor is configured to execute the computer program stored in the memory to perform a processing action in the method provided in any one of the first aspect or the optional manners of the first aspect, or execute the computer program stored in the memory to perform a processing action in the method provided in any one of the second aspect or the optional manners of the second aspect.

According to a sixth aspect, a congestion control system is provided, including at least two access points. Operating channels of the at least two access points overlap, and the at least two access points include a first access point configured to perform the method provided in any one of the first aspect or the optional manners of the first aspect, or a first access point configured to perform the method provided in any one of the second aspect or the optional manners of the second aspect.

Optionally, the at least two access points further include a second access point, and the second access point is a neighboring access point of the first access point.

The first access point is configured to send a first indication to the second access point.

The second access point is configured to perform traffic control on a non-key service of the second access point based on the first indication.

Optionally, the first access point includes the congestion control apparatus provided in the third aspect to the fifth aspect.

According to a seventh aspect, a computer-readable storage medium is provided, where the computer-readable storage medium stores a computer program. When the computer program is executed, the congestion control method provided in any one of the first aspect or the optional manners of the first aspect is implemented, or the congestion control method provided in any one of the second aspect or the optional manners of the second aspect is implemented.

According to an eighth aspect, a computer program product is provided. The computer program product includes a program or code. When the program or the code is executed, the congestion control method provided in any one of the first aspect or the optional manners of the first aspect is implemented, or the congestion control method provided in any one of the second aspect or the optional manners of the second aspect is implemented.

According to a ninth aspect, a chip is provided. The chip includes a programmable logic circuit and/or program instructions. When the chip is running, the chip is configured to implement the congestion control method provided in any one of the first aspect or the optional manners of the first aspect, or implement the congestion control method provided in any one of the second aspect or the optional manners of the second aspect.

The technical solutions provided in this application bring the following beneficial effects.

According to the congestion control method, apparatus, and system provided in this application, the first access point may send the first indication to the second access point, and the second access point may perform traffic control on the non-key service of the second access point based on the first indication. The operating channel of the first access point and the operating channel of the second access point overlap, and the second access point is a neighboring access point of the first access point. Therefore, after the second access point performs traffic control on the non-key service of the second access point, the service (for example, the key service) of the first access point and the key service of the second access point can use more channel resources. This helps improve the QoS of the service of the first access point and the QoS of the key service of the second access point. The second access point is a neighboring access point of the first access point, and the operating channel of the first access point and the operating channel of the second access point overlap. That is, the first access point and the second access point are neighboring access points deployed on a same frequency band. Therefore, collaborative work of intra-frequency neighboring access points is implemented in this application.

DESCRIPTION OF EMBODIMENTS

Figure 1:
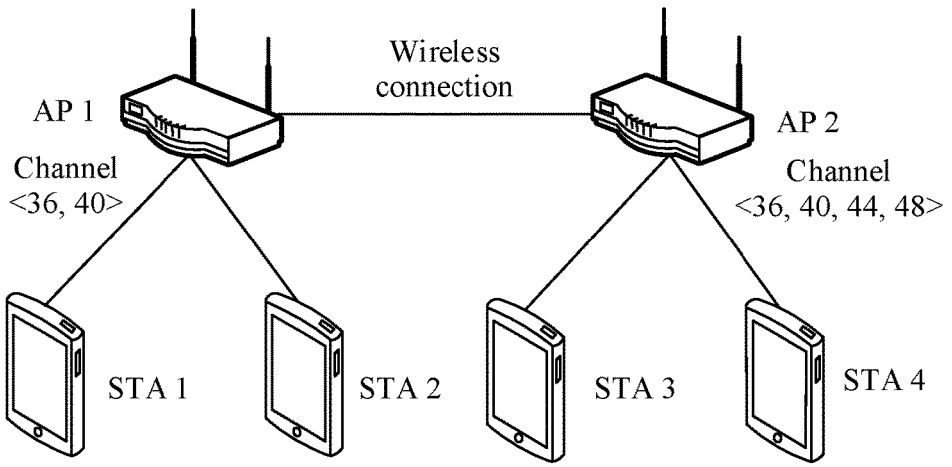
FIG. 1 is a schematic diagram of an implementation environment according to an embodiment of this application.

The following further describes implementations of this application in detail with reference to the accompanying drawings.

As defined in the Institute of Electrical and Electronics Engineers (IEEE) 802.11 series standards (or a WLAN protocol), a WLAN frequency band includes a 2.4 gigahertz (GHz) frequency band and a 5 GHz frequency band. The 2.4 GHz frequency band includes 2.4 GHz to 2.4835 GHz, and the 5 GHz frequency band includes 5.150 GHz to 5.895 GHz.

To avoid co-channel interference, WLAN frequency bands are divided into independent channels, and frequency bands of different independent channels do not overlap. For example, the 2.4 GHz frequency band is divided into 14 overlapping channels, and the 14 channels include three independent channels: a channel 1, a channel 6, and a channel 11. The 5 GHz frequency band is divided into 24 channels each with a bandwidth of 20 megahertz (MHz). Each of the 24 channels is an independent channel. In addition, some continuous channels each with a bandwidth of 20 MHz may form a channel with a larger bandwidth (for example, 40 MHz, 80 MHz, or 160 MHz). For example, channels on the 5 GHz frequency band include a channel 32, a channel 36, a channel 40, a channel 44, and a channel 48. Each of the channel 32, the channel 36, the channel 40, the channel 44, and the channel 48 is a channel with a bandwidth of 20 MHz. The channel 32 and the channel 36 may form a channel <32, 36> with a bandwidth of 40 MHz. The channel 36 and the channel 40 may form a channel <36, 40> with a bandwidth of 40 MHz. The channel 36, the channel 40, the channel 44, and the channel 48 may form a channel <36, 40, 44, 48> with a bandwidth of 80 MHz.

In this embodiment of this application, "x" in "channel x" is a channel number defined in the WLAN protocol.

A WLAN includes an AP and a STA, and the AP is configured to provide a network access service for a STA associated with the AP. Because a signal coverage area of a single AP is limited, in a scenario (which may be referred to as a high-density scenario) in which STAs are densely distributed, for example, an office, a dining hall, an airport, or a railway station, a plurality of APs usually need to be deployed to meet a signal coverage requirement. In addition, to avoid mutual impact between the APs, APs that are relatively close to each other are usually deployed at different frequencies (that is, operating channels of the APs that are relatively close to each other are usually staggered, and each AP uses an independent channel). However, because a quantity of independent channels in the WLAN is limited, the APs that are relatively close to each other inevitably need to be deployed on a same frequency band. That is, the operating channels of the APs that are relatively close to each other inevitably overlap.

In this embodiment of this application, that a plurality of APs is deployed on a same frequency band means that operating channels of the plurality of APs overlap. The operating channel of the AP may include at least one sub-channel. That the operating channels of the plurality of APs overlap includes that the operating channels of the plurality of APs have at least one same sub-channel. In other words, the operating channels of the plurality of APs are completely the same, or the operating channels of the plurality of APs are partially the same. For example, both an operating channel of an AP 1 and an operating channel of an AP 2 are a channel <36, 40>. The channel <36, 40> is a channel with a bandwidth of 40 MHz, and includes two channels each with a bandwidth of 20 MHz: a channel 36 and a channel 40. The two channels each with a bandwidth of 20 MHz, the channel 36 and the channel 40, are sub-channels of the channel <36, 40> with a bandwidth of 40 MHz. The operating channel of the AP 1 and the operating channel of the AP 2 overlap, and are completely the same. For another example, the operating channel of the AP 1 is a channel <32, 36>, and the operating channel of the AP 2 is the channel <36, 40>. The operating channel of the AP 1 and the operating channel of the AP 2 overlap, and are partially the same. For another example, the operating channel of the AP 1 is the channel <36, 40>, and the operating channel of the AP 2 is a channel <36, 40, 44, 48>. The operating channel of the AP 1 and the operating channel of the AP 2 overlap, and are partially the same. In addition, APs that are close to each other are neighbors to each other. For two APs that are close to each other, one AP may be referred to as a neighboring AP of the other AP. For example, if the AP 1 and the AP 2 are relatively close to each other, the AP 1 may be referred to as a neighboring AP of the AP 2, and the AP 2 may be referred to as a neighboring AP of the AP 1. If two APs are deployed on a same frequency band and are neighbors to each other, one AP may be referred to as an intra-frequency neighboring AP of the other AP. For example, the operating channel of the AP 1 and the operating channel of the AP 2 overlap, and the AP 1 and the AP 2 are close to each other. In this case, the AP 1 may be referred to as an intra-frequency neighboring AP of the AP 2, and the AP 2 may be referred to as an intra-frequency neighboring AP of the AP 1.

In the WLAN, the AP communicates with the STA associated with the AP through an air interface and shares air interface resources with the STA associated with the AP. Neighboring APs deployed on a same frequency band (namely, the APs deployed on the same frequency band and are neighbors to each other) and STAs associated with these APs share air interface resources. In an example, signals sent by the neighboring APs deployed on the same frequency band and the STAs associated with these APs may conflict with each other. The neighboring APs deployed on the same frequency band and the STAs associated with these APs share the air interface resources. Therefore, air interface congestion easily occurs on the APs. In particular, with the increase of WLAN network devices and emergence of new services such as video conferencing and cloud backup, network traffic increases and traffic bursts increase sharply. In this case, air interface congestion is more likely to occur on the APs. In addition, air interface congestion occurring on one AP may also cause air interface congestion on an intra-frequency neighboring AP of the AP. Air interface congestion may cause a packet loss, a long transmission delay, and a low throughput on the WLAN. As a result, QoS of a service cannot be guaranteed.

To relieve air interface congestion on the AP, a related technology provides a congestion control solution. In this congestion control solution, when air interface congestion occurs on one AP (for example, the AP 1), the AP 1 sends a disassociation message to a STA (for example, a STA 1) associated with the AP 1, to indicate the STA 1 to disassociate from the AP 1 (that is, indicate the STA 1 to disconnect from the AP 1). The STA 1 releases a connection between the STA 1 and the AP 1 based on the disassociation message, to reduce load of the AP 1 and relieve air interface congestion on the AP 1.

However, after being disassociated from the AP 1, the STA 1 may be associated with an intra-frequency neighboring AP (for example, the AP 2) of the AP 1. Because the AP 1 shares the air interface resources with the intra-frequency neighboring AP of the AP 1, air interface congestion on the AP 1 cannot be relieved when the STA 1 is associated with the AP 2. In addition, after the STA 1 is associated with the AP 2, if air interface congestion occurs on the AP 2, to relieve air interface congestion on the AP 2, the AP 2 sends a disassociation message to the STA 1, to indicate the STA 1 to disassociate from the AP 2, and the STA 1 disconnects from the AP 2 based on the disassociation message. After the STA 1 disassociates from the AP 2, the STA 1 may be associated with the AP 1 (the intra-frequency neighboring AP of the AP 2). As a result, the STA 1 may frequently switch between the AP 1 and the AP 2, and this causes a ping-pong effect.

It can be learned from the foregoing descriptions that, although the congestion control solution is provided in the related technology, the congestion control solution may be difficult to relieve air interface congestion on the AP. In this case, it is difficult to ensure QoS of a key service of the AP. In addition, the congestion control solution cannot coordinate work of the APs deployed on the same frequency band. Therefore, how to coordinate work of the APs deployed on the same frequency band to relieve air interface congestion on the AP and improve the QoS of the key service is a problem that urgently needs to be resolved in the WLAN.

In view of the foregoing problem existing in the WLAN, embodiments of this application provide a congestion control method, apparatus, and system. According to the technical solutions provided in embodiments of this application, an operating channel of a first access point (for example, the AP 1) and an operating channel of a second access point (for example, the AP 2) overlap. The second access point is a neighboring access point of the first access point (that is, the second access point is an intra-frequency neighboring access point of the second access point). The first access point may send a first indication to the second access point to indicate the second access point to perform traffic control on a non-key service of the second access point. The second access point may perform traffic control on the non-key service of the second access point based on the first indication. In this way, cooperative work of the first access point and the second access point is implemented, and this helps relieve air interface congestion on the first access point, and improves QoS of a service of the first access point and QoS of a key service of the second access point.

The following describes the technical solutions in embodiments of this application. First, an implementation environment of embodiments of this application is described.

FIG. 1 is a schematic diagram of an implementation environment according to an embodiment of this application. In the implementation environment, a wireless communications network is provided. The wireless communications network may be a WLAN, for example, a campus WLAN. The wireless communications network includes at least two APs and at least one STA associated with each AP. FIG. 1 is described by using an example in which the wireless communications network includes an AP 1, an AP 2, and a STA 1 to a STA 4.

The STA 1 and the STA 2 each are associated with the AP 1, and the STA 3 and the STA 4 each are associated with the AP 2. A distance between the AP 1 and the AP 2 is less than a distance threshold. In addition, an operating channel of the AP 1 and an operating channel of the AP 2 overlap.

Because the distance between the AP 1 and the AP 2 is less than the distance threshold, the distance between the AP 1 and the AP 2 is relatively short, and the AP 1 and the AP 2 are neighbors to each other. The distance threshold may be determined based on an actual situation. For example, the distance threshold is determined based on a coverage area or another parameter of an AP in the wireless communications network.

That an operating channel of the AP 1 and an operating channel of the AP 2 overlap includes that at least one sub-channel of the operating channel of the AP 1 is the same as at least one sub-channel of the operating channel of the AP 2. For example, the operating channel of the AP 1 is completely the same as the operating channel of the AP 2, or some of the sub-channels of the operating channel of the AP 1 is the same as some of the sub-channels of the operating channel of the AP 2. For example, as shown in FIG. 1, the operating channel of the AP 1 is a channel <36, 40>, and the operating channel of the AP 2 is a channel <36, 40, 44, 48>. The operating channel of the AP 1 and the operating channel of the AP 2 overlap, and the AP 1 and the AP 2 are two APs deployed on a same frequency band.

The AP 1 and the AP 2 may communicate with each other through a wired network or an air interface. In this embodiment of this application, for example, the AP 1 communicates with the AP 2 through the air interface. In this case, a connection between the AP 1 and the AP 2 is a wireless connection. In the wireless communications network shown in FIG. 1, the AP 1 is an intra-frequency neighboring AP of the AP 2, and the AP 2 is an intra-frequency neighboring AP of the AP 1. The AP 1 communicates with the STA 1 and the STA 2 through an air interface, and the AP 1, the STA 1, and the STA 2 share air interface resources. The AP 2 communicates with the STA 3 and the STA 4 through an air interface, and the AP 2, the STA 3, and the STA 4 share air interface resources. The AP 1 and the AP 2 share air interface resources. That is, the AP 1, the AP 2, and the STA 1 to the STA 4 share the air interface resources.

When air interface congestion occurs on the AP 1, the AP 1 may send an indication to the AP 2 to indicate the AP 2 to perform traffic control on a non-key service of the AP 2. Because the AP 1 and the AP 2 share the air interface resources, after the AP 2 performs traffic control on the non-key service of the AP 2, air interface congestion occurring on the AP 1 may be relieved, and QoS of a service of the AP 1 and QoS of a key service of the AP 2 may be improved. Similarly, when air interface congestion occurs on the AP 2, the AP 2 may send an indication to the AP 1 to indicate the AP 1 to perform traffic control on a non-key service of the AP 1. Because the AP 1 and the AP 2 share the air interface resources, after the AP 1 performs traffic control on the non-key service of the AP 1, air interface congestion on the AP 2 may be relieved, and QoS of a service of the AP 2 and QoS of a key service of the AP 1 may be improved. It can be learned that, in this application, cooperative work of the intra-frequency neighboring APs is implemented, and air interface congestion on the AP is relieved through the cooperative work of the intra-frequency neighboring APs. This improves the QoS of the key service.

In this embodiment of this application, the AP may be a switch, a router, a virtual switch, a virtual router, or the like. The AP is used in a broadband home, inside a building, inside a campus, or the like. A signal of the AP may cover a range of tens of meters to hundreds of meters. The STA may be a desktop device, a laptop device, a handheld device, a wearable device, a smart home device, a computing device, a vehicle-mounted device, or the like that has a wireless connection function. For example, the STA may be a mobile phone, a netbook, a notebook computer, a tablet computer, a smartwatch, a supercomputer, an ultra-mobile personal computer (UMPC), a smart camera, a personal digital assistant (PDA), a portable multimedia player (PMP), an augmented reality (AR) device, a virtual reality (VR) device, a wireless device on an airplane, a wireless device on a robot, a wireless device in industrial control, a wireless device in telemedicine, a wireless device in a smart grid, a wireless device and the like in a smart city, a wireless device in a narrow band (NB) system, or a wireless device in an Internet of Things (IoT) system, for example, a sensor or a camera. Alternatively, the STA may be an industrial manufacturing automatic optical inspection (AOI) device or the like. A type and a structure of the AP, a type and a structure of the STA, and the like are not limited in this embodiment of this application.

It should be noted that the implementation environment shown in FIG. 1 and the foregoing descriptions of the AP and the STA are merely used as examples, and are not intended to limit the technical solutions of this application. In an implementation process, a quantity of APs, a quantity of STAs, a quantity of STAs associated with the AP, and an operating channel of the AP may be configured based on a requirement, and another device may be further configured in the wireless communications network. For example, a controller is configured in the wireless communications network. In addition, the AP may be any device, other than the foregoing listed devices, that provides a network access service for the STA, and the STA may be any wireless device that has a wireless network access function other than the foregoing listed devices. For example, the STA may be any device that has a WLAN connection function. This is not limited in this embodiment of this application.

The following describes a method embodiment of this application. In the following method embodiment, an example in which an AP 1 and an AP 2 cooperate to relieve air interface congestion is used for description. In addition, in the following method embodiment, the AP 1 may be the AP 1 in the implementation environment shown in FIG. 1, and the AP 2 may be the AP 2 in the implementation environment shown in FIG. 1. In addition, the AP 1 may be the first access point according to claims 9 to 16, and the AP 2 may be the first access point according to claims 1 to 8.

Figure 2:
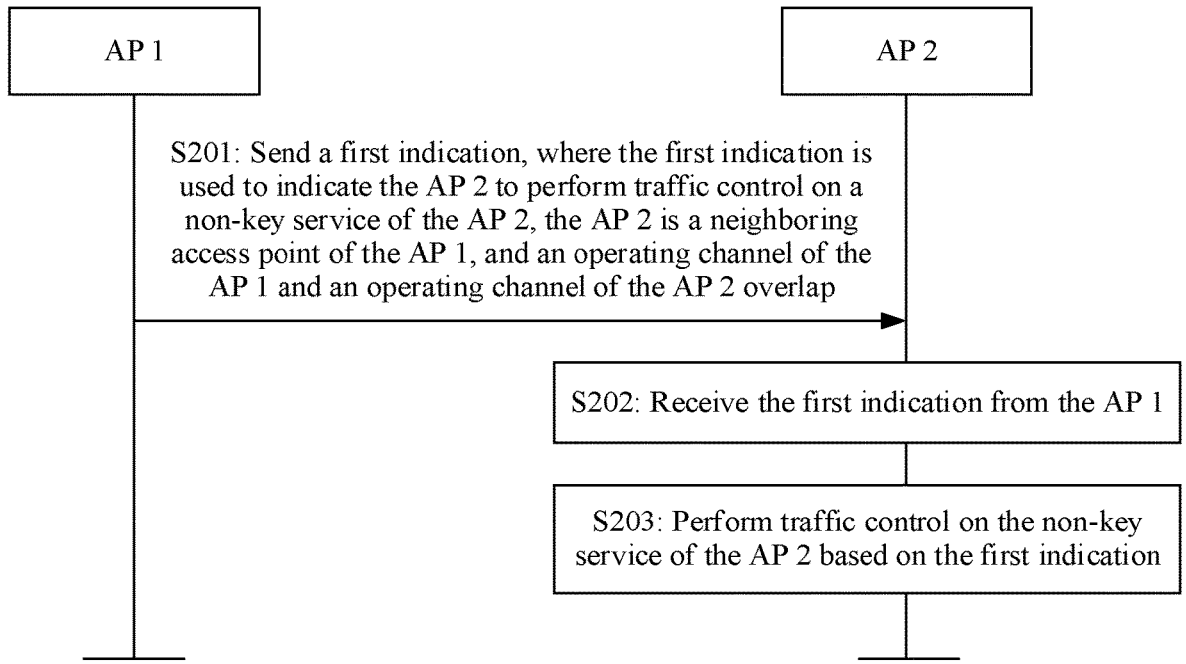
FIG. 2 is a flowchart of a congestion control method according to an embodiment of this application.

FIG. 2 is a flowchart of a congestion control method according to an embodiment of this application. As shown in FIG. 2, the congestion control method includes the following step 201 to step 203.

S201: An AP 1 sends a first indication to an AP 2, where the first indication is used to indicate the AP 2 to perform traffic control on a non-key service of the AP 2, the AP 2 is a neighboring access point of the AP 1, and an operating channel of the AP 1 and an operating channel of the AP 2 overlap.

The AP 2 is a neighboring access point of the AP 1. That is, the AP 1 and the AP 2 are neighbors to each other. A distance between the AP 1 and the AP 2 is less than a distance threshold. The distance threshold may be determined based on a coverage range or another parameter of an AP.

That an operating channel of the AP 1 and an operating channel of the AP 2 overlap includes that at least one sub-channel of the operating channel of the AP 1 is the same as at least one sub-channel of the operating channel of the AP 2. For example, the operating channel of the AP 1 is completely the same as the operating channel of the AP 2, or some of the sub-operating channels of the operating channel of the AP 1 is the same as some of the sub-operating channels of the operating channel of the AP 2.

Whether a service is a key service may be determined based on access categories (AC). For example, the access category includes voice (VO), video (VI), best effort (BE), and background (BK). The key service is, for example, a VO service (that is, a service whose access category is VO) and a VI service (that is, a service whose access category is VI), and a non-key service is correspondingly a BK service (that is, a service whose access category is BK) and a BE service (that is, a service whose access category is BE). In this application, distinguishing between the key service and the non-key service based on the access categories is merely an example. In some embodiments, the key service and the non-key service may be distinguished based on an application type. For example, the application type includes live broadcast, video, voice, backup, and the like, the key service is, for example, a live broadcast service, a video service, or a voice service, and the non-key service is correspondingly a backup service.

In an optional embodiment, when air interface congestion occurs on the AP 1, the AP 1 sends the first indication to the AP 2 to indicate the AP 2 to perform traffic control on the non-key service of the AP 2. In this embodiment of this application, that air interface congestion occurs on the AP 1 includes: utilization (channel utilization (CU)) of the operating channel of the AP 1 is greater than a target threshold, and a key service of the AP 1 is affected. That is, the AP 1 sends the first indication to the AP 2 when determining that the utilization of the operating channel of the AP 1 is greater than the target threshold and the key service of the AP 1 is affected. The target threshold may be set based on an actual situation. For example, the target threshold is 80%.

That a key service of the AP 1 is affected includes: QoS of the key service of the AP 1 is lower than a QoS requirement of the key service. The QoS includes one or more of the following: an average delay, a maximum delay, a jitter, and a throughput. Correspondingly, the QoS requirement includes one or more of the following: an average delay threshold, a maximum delay threshold, a jitter threshold, and a throughput threshold. That QoS of the key service of the AP 1 is lower than a QoS requirement of the key service includes one or more of the following. The average delay of the key service is greater than the average delay threshold in the QoS requirement of the key service, the maximum delay of the key service is greater than the maximum delay threshold in the QoS requirement of the key service, the jitter of the key service is greater than the jitter threshold in the QoS requirement of the key service, and the throughput of the key service is less than the throughput threshold in the QoS requirement of the key service.

In an optional implementation, if at least one QoS indicator (for example, the average delay, the maximum delay, the jitter, and the throughput) of the key service of the AP 1 does not meet the QoS requirement of the key service, the AP 1 determines that the key service is affected. For example, if the average delay of the key service of the AP 1 is greater than the average delay threshold in the QoS requirement of the key service, and other QoS indicators of the key service all meet the QoS requirement of the key service, the AP 1 determines that the key service is affected.

In another optional implementation, if a quantity of indicators, in the QoS indicators of the key service of the AP 1, that do not meet the QoS requirement of the key service is greater than or equal to a first quantity, the AP 1 determines that the key service is affected. For example, the first quantity is 2. If the average delay of the key service of the AP 1 is greater than the average delay threshold in the QoS requirement of the key service, and the other QoS indicators of the key service all meet the QoS requirement of the key service, because the quantity of indicators, in the QoS indicators of the key service of the AP 1, that do not meet the QoS requirement of the key service is less than the first quantity, the AP 1 determines that the key service is not affected. If the average delay of the key service of the AP 1 is greater than the average delay threshold in the QoS requirement of the key service, the throughput of the key service is less than the throughput threshold in the QoS requirement of the key service, but the maximum delay of the key service of the AP 1 is greater than the maximum delay threshold in the QoS requirement of the key service, and the jitter of the key service of the AP 1 is greater than the jitter threshold in the QoS requirement of the key service, because in the QoS indicators of the key service of the AP 1, the quantity of indicators that do not meet the QoS requirement of the key service is equal to the first quantity, the AP 1 determines that the key service is affected.

In still another optional implementation, if a specific QoS indicator in the QoS indicators of the key service of the AP 1 does not meet the QoS requirement of the key service, the AP 1 determines that the key service is affected. The specific QoS indicator may include one or more of the average delay, the maximum delay, the jitter, and the throughput.

In this embodiment of this application, the AP 1 may monitor the utilization of the operating channel of the AP 1 and the QoS of the key service of the AP 1 in real time or periodically, and determine whether the utilization of the operating channel of the AP 1 is greater than the target threshold, and determine whether the QoS of the key service of the AP 1 is lower than the QoS requirement of the key service. If the utilization of the operating channel of the AP 1 is greater than the target threshold and the QoS of the key service of the AP 1 is lower than the QoS requirement of the key service, the AP 1 determines that air interface congestion occurs on the AP 1, and sends the first indication to the AP 2. If the utilization of the operating channel of the AP 1 is not greater than the target threshold, and/or the QoS of the key service of the AP 1 is not lower than the QoS requirement of the key service, the AP 1 does not send the first indication to the AP 2. The AP 1 includes a medium access control (MAC) layer unit, and an implementation process in which the AP 1 monitors the QoS of the key service of the AP 1 may be executed by the MAC layer unit. The MAC layer unit may be an independent chip, or a processing circuit integrated into a same chip with another unit.

In an optional embodiment, the AP 1 is configured to forward a service, and the service forwarded by the AP 1 includes one or more types of a VO service, a VI service, a BE service, and a BK service. A buffer of the AP 1 includes a queue (for example, a VO queue corresponding to the VO service, a VI queue corresponding to the VI service, a BE queue corresponding to the BE service, and a BK queue corresponding to the BK service) corresponding to each type of service. When receiving a packet of each type of service, the AP 1 first buffers the packet in a corresponding queue of the service, and then forwards the packet in the queue based on a position of the packet in the queue. For example, the key service of the AP 1 is a VO service. The AP 1 monitors an enqueuing timestamp at which each VO packet (for brevity, a packet of a VO service is referred to as a VO packet) enters a VO queue and a dequeuing timestamp (for example, a sending timestamp of the AP 1 for the VO packet) at which each VO packet leaves the VO queue. A time difference between the dequeuing timestamp and the enqueuing timestamp of the VO packet is determined as a delay of the VO packet in the VO queue. In this way, the AP 1 may determine a delay of each VO packet in the VO queue. Then, the AP 1 determines an average value of delays of all VO packets that are successfully sent within specified duration (for example, 1 second) and that are in the VO queue, and determines the average value as an average delay of the VO service. The AP 1 determines a maximum value of the delays of all the VO packets that are successfully sent within the specified duration and that are in the VO queue, and determines the maximum value as a maximum delay of the VO service. The AP 1 determines the maximum value and a minimum value of the delays of all the VO packets that are successfully sent within the specified duration and that are in the VO queue, and determines a difference between the maximum value and the minimum value as a jitter of the VO service. In addition, the AP 1 determines a total data volume (that is, a sum of bytes of all the VO packets) of all the VO packets that are successfully sent within the specified duration, and determines the total data volume as a throughput of the VO service. In this way, QoS of the VO service is monitored.

In an optional embodiment, the AP 1 sends a first beacon frame to the AP 2, where the first beacon frame carries the first indication. For example, the AP 1 sends the first beacon frame to the AP 2 in a broadcast, multicast, or unicast manner. In this embodiment of this application, an example in which the first beacon frame is a broadcast frame is used for description. In this case, the AP 1 sends the first beacon frame to the AP 2 in the broadcast manner.

The first beacon frame may include a control indication field, and the first indication may be located in the control indication field. For example, the control indication field may be located in a frame body of the first beacon frame. A length of the control indication field may be set based on an actual requirement. For example, the length of the control indication field is 1 bit.

Figure 3:
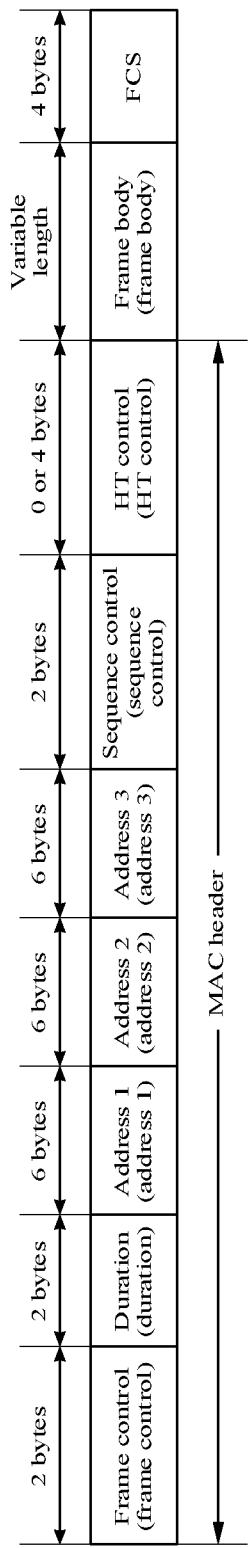
FIG. 3 is a schematic diagram of a structure of a beacon frame according to an embodiment of this application.

FIG. 3 is a schematic diagram of a structure of a beacon frame according to an embodiment of this application. The beacon frame includes a MAC header, a frame body, and a frame check sequence (FCS) field. The MAC header includes a frame control field, a frame duration field, an address 1 field, an address 2 field, an address 3 field, a sequence control field, and a high throughput (HT) control field. The frame duration field is used to record duration of the beacon frame (that is, a length of the beacon frame), the address 1 field is used to record a destination address, the address 2 field is used to record a source address, and the address 3 field is used to record a basic service set identifier (BSSID). The control indication field may be located in the frame body. For example, a field whose order number is 68 may be added to the frame body as the control indication field, and a value in the control indication field may be 0 or 1. 1 indicates performing traffic control, and 0 indicates releasing traffic control. For a structure of the first beacon frame in this embodiment of this application, refer to FIG. 3. In the first beacon frame, the value in the control indication field is the first indication, and the value in the control indication field is 1.

In this embodiment of this application, an example in which the AP 1 sends the first indication to the AP 2 by using a beacon frame is used for description. The AP 1 may alternatively send the first indication to the AP 2 in another wireless or wired manner. For example, the AP 1 sends, in the wireless manner, a message that carries the first indication to the AP 2, to send the first indication to the AP 2. Alternatively, the AP 1 sends, in the wired manner, a message that carries the first indication to a controller connected to the AP 1, and the controller forwards the message to the AP 2, so that the AP 1 sends the first indication to the AP 2.

S202: The AP 2 receives the first indication from the AP 1.

In an optional embodiment, the AP 2 receives the first beacon frame from the AP 1, where the first beacon frame carries the first indication.

In another embodiment, corresponding to S201, the AP 2 may further receive, from the AP 1, another message that carries the first indication.

S203: The AP 2 performs traffic control on the non-key service of the AP 2 based on the first indication.

The AP 2 first obtains the first indication from the first beacon frame, and then performs traffic control on the non-key service of the AP 2 based on the first indication. In an optional embodiment, if the AP 2 receives the first indication and channel utilization of the non-key service of the AP 2 is greater than a control threshold, the AP 2 performs traffic control on the non-key service of the AP 2. The non-key service of the AP 2 may be a BK service or a BE service. The control threshold may be set based on an actual situation. For example, the control threshold is 50%.

In this embodiment of this application, the AP 2 may monitor the channel utilization of the non-key service of the AP 2 in real time or periodically, and determine whether the channel utilization of the non-key service is greater than the control threshold. If the channel utilization of the non-key service is greater than the control threshold and the AP 2 receives the first indication, the AP 2 performs traffic control on the non-key service of the AP 2.

In an optional embodiment, that the AP 2 performs traffic control on the non-key service of the AP 2 includes that the AP 2 performs traffic control on the non-key service of the AP 2 that needs to be sent, and/or the AP 2 indicates a STA associated with the AP 2 to perform traffic control on the non-key service. For example, that the AP 2 performs traffic control on the non-key service of the AP 2 that needs to be sent includes that the AP 2 decreases a rate of forwarding the non-key service by the AP 2, and/or the AP 2 decreases a channel access probability of the non-key service. That the AP 2 indicates a STA associated with the AP 2 to perform traffic control on the non-key service, for example, includes that the AP 2 indicates the STA associated with the AP 2 to decrease a rate (that is, a rate of sending a packet of the non-key service) of sending the non-key service to the AP 2 by the STA, and/or the AP 2 indicates the STA associated with the AP 2 to reduce the channel access probability of the non-key service, and/or the AP 2 indicates the STA associated with the AP 2 to decrease a data volume that is of the non-key service and sent to the AP 2 by the STA.

An example in which the AP 2 indicates the STA associated with the AP 2 to perform traffic control on the non-key service is used for description. The AP 2 may send a modification indication (for example, a first modification indication) to the STA associated with the AP 2, where the first modification indication is used to indicate the STA associated with the AP 2 to modify an EDCA parameter of the non-key service. After receiving the first modification indication, the STAs (for example, the STA 3 and the STA 4 in FIG. 1) associated with the AP 2 modify the EDCA parameter of the non-key service based on the first modification indication, to reduce the channel access probability of the non-key service, so as to perform traffic control on the non-key service.

In an optional embodiment, the AP 2 sends a third beacon frame to the STA associated with the AP 2, where the third beacon frame carries the first modification indication. That is, the AP 2 sends the first modification indication to the STA by sending a beacon frame. The AP 2 may send, in the broadcast, multicast, or unicast manner, the third beacon frame to the STA associated with the AP 2. This is not limited in this embodiment of this application. In some embodiments, the AP 2 may further send, in another wireless manner, the first modification indication to the STA associated with the AP 2.

The EDCA parameter may include a contention window (CW) parameter, a transmission opportunity (TXOP) parameter, and the like, and may further include another parameter. In this embodiment of this application, an example in which the EDCA parameter includes the CW parameter is used for description. The CW parameter of the non-key service defines a width of a CW of the non-key service, and the CW parameter may represent the channel access probability (for example, a probability that the STA successfully contends for a channel for the non-key service) of the non-key service. The CW parameter of the non-key service may include at least one of a minimum width (CWmin) of the CW of the non-key service or a maximum width (CWmax) of the CW of the non-key service, and both the CWmin and the CWmax may be adjusted. The CWmin is usually not less than a minimum value that is of the CWmin of the non-key service and specified in a standard, the CWmax is usually not greater than a maximum value of the CWmax that is of the non-key service and specified in the standard, and the width of the CW of the non-key service varies between the CWmin and the CWmax. Usually, a smaller CWmin of the non-key service indicates a higher channel access probability of the non-key service, and a larger CWmin of the non-key service indicates a lower channel access probability of the non-key service. A smaller CWmax of the non-key service indicates a higher channel access probability of the non-key service, and a larger CWmax of the non-key service indicates a lower channel access probability of the non-key service. Therefore, the first modification indication sent by the AP 2 to the STA that is associated with the AP 2 may indicate the STA associated with the AP 2 to increase the CWmin of the non-key service and/or increase the CWmax of the non-key service. The STA associated with the AP 2 increases the CWmin of the non-key service, and/or increases the CWmax of the non-key service based on the first modification indication. After the STA increases the CWmin of the non-key service and/or increases the CWmax of the non-key service, the probability that the STA accesses the channel for the non-key service is reduced. Therefore, a probability of transmitting the non-key service to the AP 2 by the STA is reduced, and suppression on the non-key service is implemented. That is, traffic control on the non-key service is implemented.

In an implementation, the first modification indication sent by the AP 2 to the STA that is associated with the AP 2 carries a first minimum width of the CW of the non-key service. The first minimum width is greater than an initial minimum width of the CW of the non-key service. The initial minimum width is a CWmin used by the STA for contending for a channel for the non-key service before the AP 2 sends the first modification indication to the STA associated with the AP 2. The STA modifies the CWmin of the CW of the non-key service to the first minimum width based on the first modification indication. Therefore, the STA increases the CWmin of the non-key service, to implement traffic control on the non-key service. In another implementation, the first modification indication sent by the AP 2 to the STA that is associated with the AP 2 carries a first maximum width of the CW of the non-key service. The first maximum width is greater than an initial maximum width of the CW of the non-key service. The initial maximum width is a CWmax used by the STA for contending for a channel for the non-key service before the AP 2 sends the first modification indication to the STA associated with the AP 2. The STA modifies the CWmax of the non-key service to the first maximum width based on the first modification indication. Therefore, the STA increases the CWmax of the non-key service, to implement traffic control on the non-key service. In actual application, the two implementations provided in this paragraph may be separately used (that is, the first modification indication carries one of the first minimum width and the first maximum width), or may be used in combination (that is, the first modification indication carries the first minimum width and the first maximum width).

The EDCA parameter is a parameter defined in an EDCA mechanism. To facilitate understanding of content that the STA performs traffic control on the non-key service by modifying the EDCA parameter of the non-key service, the following briefly describes the EDCA mechanism.

The EDCA mechanism defines four ACs: AC_VO (VO), AC_VI (VI), AC_BE (BE), and AC_BK (BK). Each AC is defined by a specific value of a group of access parameters (that is, EDCA parameters). The access parameters of each AC specify a priority of a service access channel of the AC in statistics. In the EDCA mechanism, traffic is logically sorted into eight queues (for example, two VO queues, two VI queues, two BE queues, and two BK queues) corresponding to the four ACs. An EDCA access function instance is run on each non-empty queue based on access parameters of an AC corresponding to the queue, to contend for a channel for a service of the AC. For example, a process in which a device (an AP, a STA, or another device) contends for a channel for a service of an AC includes the following. When detecting that the channel is in an idle state, the device first delays fixed duration starting from a moment at which the device determines that the channel is in the idle state, delays random backoff duration (or referred to as a random backoff time period) based on the fixed duration when the fixed duration ends, and contends for the channel for the service of the AC (for example, attempts to transmit the service of the AC on the channel) at an end moment of the random backoff duration. A process of contending for the channel for the service of the AC is implemented by the device by running the EDCA access function instance.

In the EDCA mechanism, for a service of an AC, fixed delay duration in a process in which the device contends for a channel for the service of the AC is referred to as an arbitration inter-frame space (AIFS), and a value of the AIFS relates to the AC. AIFSs of services of different ACs are usually determined according to a formula AIFS(AC)=a× SIFSTime+AIFSN(AC)×a×SlotTime. In the formula, a is a constant, SIFSTime is duration of a short inter-frame space (SIFS), AIFSN is a quantity of timeslots, and SlotTime defines a timeslot length of a specific physical layer (PHY). AIFS(AC) and AIFSN(AC) relate to the AC, and SIFSTime and SlotTime are fixed values.

In the EDCA mechanism, for a service of an AC, random backoff duration delayed in a process in which the device contends for a channel for the service of the AC is determined based on a CW (that is, a CW of the service) of the service of the AC. For example, a random number is determined based on the CW of the service of the AC, and a product of the random number and the timeslot length is the random backoff duration. A CW parameter of a service of each AC includes one CWmin and one CWmax. Both the CWmin and the CWmax may be adjusted. The CWmin is usually not less than a minimum value of the CWmin that is of the service of the AC and specified in the standard, and the CWmax is usually not greater than a maximum value that is of the CWmax of the service of the AC and specified in the standard. A width of a CW of the service of each AC varies between the CWmin and the CWmax of the service of the AC. Usually, the device needs to perform at least one contention process to successfully contend for a channel for a service of an AC. For example, for a service of an AC, a width of a CW used when the device contends for a channel for the service for the first time is equal to a CWmin of the service of the AC. If the device fails in contending for the channel for the service for the first time, when the device contends for the channel for the service for the second time, the device doubles the width of the CW of the service based on the width of the CW used in contending for the channel for the service for the first time, and continues to contend for the channel for the service by using a CW whose width is doubled. If the device fails in contending for the channel for the service for the second time, when the device contends for the channel for the service for the third time, the device doubles the width of the CW of the service based on the width of the CW used in contending for the channel for the service for the second time, and continues to contend for the channel for the service by using a CW whose width is doubled. The process is repeated until the device successfully contends for the channel for the service, or until the width of the CW of the service reaches a CWmax. After the width of the CW of the service reaches the CWmax, the CWmin of the service may be reset, and the device continues to contend for the channel for the service based on a reset CWmin.

It can be learned from the foregoing description that the width of the CW affects a probability of contending for the channel for the service. The width of the CW depends on the CWmin and the CWmax. Therefore, the CWmin and the CWmax affect the probability of contending for the channel for the service. For example, Table 1 below shows EDCA parameters and priorities of services of different ACs defined in the EDCA mechanism. In Table 1, the priorities are in descending order from 1 to 4.

TABLE 1

| Priority | AC | Service | CWmin | CWmax | AIFSN |
|---|---|---|---|---|---|
| 1 | AC_VO | VO service | 7 | 15 | 2 |
| 2 | AC_VI | VI service | 15 | 31 | 2 |
| 3 | AC_BE | BE service | 31 | 1023 | 3 |
| 4 | AC_BK | BK service | 31 | 1023 | 7 |

It can be learned from Table 1 that a smaller CWmin and CWmax of a service indicate a higher priority of the service and indicate a higher channel access probability of the service, and a larger CWmin and CWmax of a service indicate a lower priority of the service and indicate a lower channel access probability of the service. Therefore, in this embodiment of this application, the AP 2 may indicate the STA associated with the AP 2 to increase the CWmin of the non-key service and/or increase the CWmax of the non-key service, so as to reduce a channel access probability of the non-key service, and suppress the non-key service.

In an optional embodiment, the AP 2 may alternatively control, in another manner, the STA associated with the AP 2 to perform traffic control on the non-key service. For example, the AP 2 decreases a value of a receive window (RWND) field in a packet that is of the non-key service and sent to the STA. In addition, the AP 2 performs traffic control on the non-key service of the AP 2 dynamically, so that when QoS of a service of the AP 1 and QoS of a key service of the AP 2 are improved, a throughput of the non-key service of the AP 2 may be stabilized at a specific level. For example, the AP 2 performs traffic control on the non-key service by continuously indicating the STA associated with the AP 2 to modify the EDCA parameter of the non-key service, so that received traffic of the AP 2 for the non-key service is stabilized at a specific level.

In conclusion, according to the congestion control method provided in this embodiment of this application, the AP 1 may send the first indication to the AP 2, and the AP 2 may perform traffic control on the non-key service of the AP 2 based on the first indication. The operating channel of the AP 1 and the operating channel of the AP 2 overlap, and the AP 2 is a neighboring access point of the AP 1. Therefore, after the AP 2 performs traffic control on the non-key service of the AP 2, the service (for example, a key service) of the AP 1 and the key service of the AP 2 can use more channel resources. This helps improve the QoS of the service of the AP 1 and the QoS of the key service of the AP 2. The AP 1 and the AP 2 are neighboring APs deployed on a same frequency band. In other words, cooperative work of the neighboring APs on the same frequency band is implemented in this embodiment of this application. In addition, when air interface congestion occurs on the AP 1, the AP 1 sends the first indication to the AP 2, and the AP 2 performs traffic control on the non-key service of the AP 2 based on the first indication. This helps relieve air interface congestion on the AP 1.

In this embodiment of this application, after the AP 2 performs traffic control on the non-key service of the AP 2, the QoS of the service of the AP 1 can be improved. After the QoS of the key service of the AP 1 reaches the QoS requirement of the key service, the AP 1 may indicate the AP 2 to cancel traffic control on the non-key service (that is, the suppressed non-key service) of the AP 2, to ensure QoS of various services of the AP 1 and the AP 2 as much as possible, and ensure throughputs of various services of the AP 1 and the AP 2, so as to improve a throughput of the wireless communications network.

Figure 4:
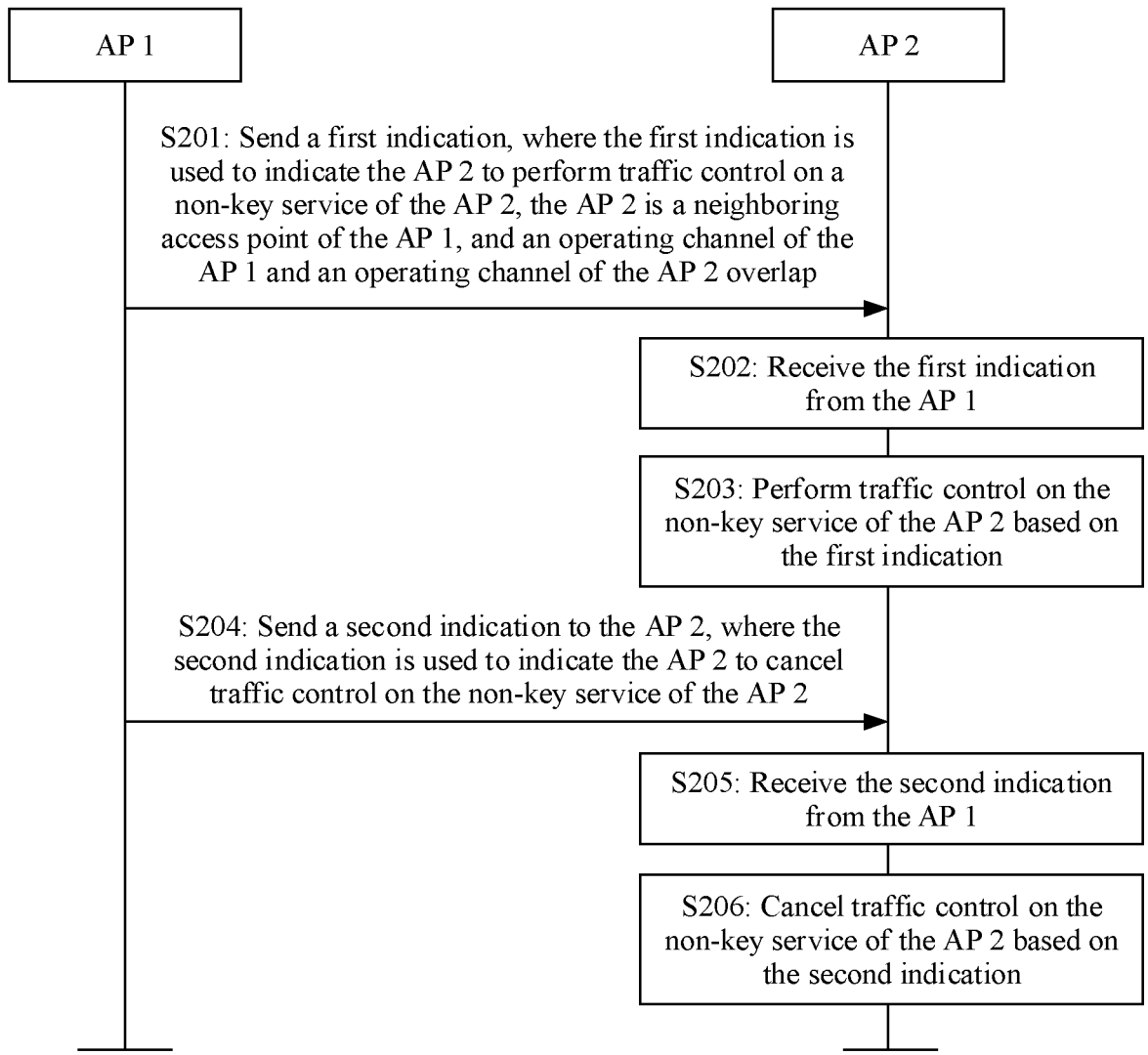
FIG. 4 is a flowchart of another congestion control method according to an embodiment of this application.

In an optional implementation of this embodiment of this application, FIG. 4 is a flowchart of another congestion control method according to an embodiment of this application. As shown in FIG. 4, after S203, the method further includes the following steps S204 to S206.

S204: The AP 1 sends a second indication to the AP 2, where the second indication is used to indicate the AP 2 to cancel traffic control on the non-key service of the AP 2.

In an optional embodiment, the AP 1 sends the second indication to the AP 2 when the key service of the AP 1 is recovered.

That the key service of the AP 1 is recovered includes that the QoS of the key service of the AP 1 meets the QoS requirement of the key service. That QoS of the key service of the AP 1 meets the QoS requirement of the key service includes one or more of the following. The average delay of the key service is less than or equal to the average delay threshold in the QoS requirement of the key service, the maximum delay of the key service is less than or equal to the maximum delay threshold in the QoS requirement of the key service, the jitter of the key service is less than or equal to the jitter threshold in the QoS requirement of the key service, and the throughput of the key service is greater than or equal to the throughput threshold in the QoS requirement of the key service.

In an optional implementation, if all the QoS indicators (for example, the average delay, the maximum delay, the jitter, and the throughput) of the key service of the AP 1 meet the QoS requirement of the key service, the AP 1 determines that the key service is recovered. For example, if the average delay of the key service of the AP 1 is less than or equal to the average delay threshold in the QoS requirement of the key service, the maximum delay of the key service is less than or equal to the maximum delay threshold in the QoS requirement of the key service, the jitter of the key service is less than or equal to the jitter threshold in the QoS requirement of the key service, and the throughput of the key service is greater than or equal to the throughput threshold in the QoS requirement of the key service, the AP 1 determines that the key service is recovered.

In another optional implementation, if the quantity of indicators, in the QoS indicators of the key service of the AP 1, that meet the QoS requirement of the key service is greater than or equal to a second quantity, the AP 1 determines that the key service is recovered. For example, the second quantity is 3. If the average delay of the key service of the AP 1 is less than or equal to the average delay threshold in the QoS requirement of the key service, the maximum delay of the key service is less than or equal to the maximum delay threshold in the QoS requirement of the key service, but the jitter of the key service is greater than the jitter threshold in the QoS requirement of the key service, and the throughput of the key service is less than the throughput threshold in the QoS requirement of the key service, because the quantity of indicators, in the QoS indicators of the key service of the AP 1, that meet the QoS requirement of the key service is less than the second quantity, the AP 1 determines that the key service is not recovered. If the average delay of the key service of the AP 1 is less than or equal to the average delay threshold in the QoS requirement of the key service, the jitter of the key service is less than or equal to the jitter threshold in the QoS requirement of the key service, and the throughput of the key service is greater than or equal to the throughput threshold in the QoS requirement of the key service, but the maximum delay of the key service is greater than the maximum delay threshold in the QoS requirement of the key service, because the quantity of indicators, in the QoS indicators of the key service of the AP 1, that meet the QoS requirement of the key service is equal to the second quantity, the AP 1 determines that the key service is recovered.

In still another optional implementation, if a specific QoS indicator in the QoS indicators of the key service of the AP 1 meets the QoS requirement of the key service, the AP 1 determines that the key service is recovered. The specific QoS indicator may include one or more of the average delay, the maximum delay, the jitter, and the throughput.

In this embodiment of this application, the AP 1 may monitor the QoS of the key service of the AP 1 in real time or periodically, and determine whether the QoS of the key service of the AP 1 meets the QoS requirement of the key service. If the QoS of the key service of the AP 1 meets the QoS requirement of the key service, the AP 1 sends the second indication to the AP 2. If the QoS of the key service of the AP 1 does not meet the QoS requirement of the key service, the AP 1 does not send the second indication to the AP 2. For an implementation process in which the AP 1 monitors the QoS of the key service of the AP 1, refer to S201. Details are not described herein again.

In an optional embodiment, that the AP 1 sends the second indication to the AP 2 includes that the AP 1 sends a second beacon frame to the AP 2, where the second beacon frame carries the second indication. For example, the AP 1 sends the second beacon frame to the AP 2 in the broadcast, multicast, or unicast manner. This is not limited in this embodiment of this application. In this embodiment of this application, an example in which the second beacon frame is a broadcast frame is used for description. In this case, the AP 1 sends the second beacon frame to the AP 2 in the broadcast manner. For a structure of the second beacon frame, refer to FIG. 3. In the second beacon frame, a value in a control indication field is the second indication, and the value in the control indication field may be 0.

In this embodiment of this application, an example in which the AP 1 sends the second indication to the AP 2 by using a beacon frame is used for description. The AP 1 may alternatively send the second indication to the AP 2 in another wireless or wired manner. For example, the AP 1 sends, in the wireless manner, a message that carries the second indication to the AP 2, to send the second indication to the AP 2. Alternatively, the AP 1 sends, in the wired manner, a message that carries the second indication to the controller connected to the AP 1, and the controller forwards the message to the AP 2, so that the AP 1 sends the second indication to the AP 2.

S205: The AP 2 receives the second indication from the AP 1.

In an optional embodiment, the AP 2 receives the second beacon frame from the AP 1, where the second beacon frame carries the second indication.

In another embodiment, corresponding to S204, the AP 2 may further receive, from the AP 1, another message that carries the second indication.

S206: The AP 2 cancels traffic control on the non-key service of the AP 2 based on the second indication.

The AP 2 first obtains the second indication from the second beacon frame, and then cancels traffic control on the non-key service of the AP 2 based on the second indication. The non-key service of the AP 2 may be a BK service or a BE service. The non-key service in S206 refers to the non-key service suppressed in S203. For example, if the non-key service suppressed in S203 is a BK service, the non-key service in S206 refers to a BK service of the AP 2.

In this embodiment of this application, a process in which the AP 2 cancels the traffic control on the non-key service of the AP 2 is corresponding to a process in which the AP 2 performs traffic control on the non-key service of the AP 2 in S203. For example, in S203, the AP 2 performs traffic control on the non-key service that needs to be sent by the AP 2, and in S206, the AP 2 cancels the traffic control on the non-key service that needs to be sent by the AP 2. In addition/alternatively, in S203, the AP 2 indicates the STA associated with the AP 2 to perform traffic control on the non-key service, and in S206, the AP 2 indicates the STA associated with the AP 2 to cancel the traffic control on the non-key service.

Corresponding to S203, that the AP 2 cancels traffic control on the non-key service that needs to be sent by the AP 2, for example, includes that the AP 2 increases the rate of forwarding the non-key service by the AP 2, and/or the AP 2 increases the channel access probability of the non-key service. That the AP 2 indicates the STA associated with the AP 2 to cancel traffic control on the non-key service, for example, includes that the AP 2 indicates the STA associated with the AP 2 to increase the rate (that is, the rate of sending the packet of the non-key service) of sending the non-key service to the AP 2 by the STA, and/or the AP 2 indicates the STA associated with the AP 2 to increase the channel access probability of the non-key service, and/or the AP 2 indicates the STA associated with the AP 2 to increase the data volume that is of the non-key service and sent to the AP 2 by the STA.

Corresponding to S203, an example in which the AP 2 indicates the STA associated with the AP 2 to cancel traffic control on the non-key service is used for description. The AP 2 may send a second modification indication to the STA associated with the AP 2, where the second modification indication is used to indicate the STA associated with the AP 2 to modify the EDCA parameter of the non-key service. After receiving the second modification indication, the STA associated with the AP 2 modifies the EDCA parameter of the non-key service based on the second modification indication, to increase the channel access probability of the non-key service, so as to cancel traffic control on the non-key service.

In an optional embodiment, the AP 2 sends a fourth beacon frame to the STA associated with the AP 2, where the fourth beacon frame carries the second modification indication. That is, the AP 2 sends the second modification indication to the STA by sending a beacon frame. The AP 2 may send, in the broadcast, multicast, or unicast manner, the fourth beacon frame to the STA associated with the AP 2. This is not limited in this embodiment of this application. In some embodiments, the AP 2 may further send, in another wireless manner, the second modification indication to the STA associated with the AP 2.

In this embodiment of this application, the second modification indication sent by the AP 2 to the STA associated with the AP 2 may indicate the STA associated with the AP 2 to decrease the CWmin of the non-key service and/or decrease the CWmax of the non-key service. The STA associated with the AP 2 may decrease the CWmin of the non-key service and/or decrease the CWmax of the non-key service based on the second modification indication. After the STA decreases the CWmin of the non-key service and/or decreases the CWmax of the non-key service, the probability that the STA accesses the channel for the non-key service is increased. Therefore, the probability of transmitting the non-key service to the AP 2 by the STA is increased, and suppression on the non-key service is released. That is, traffic control on the non-key service is canceled.

In an implementation, the second modification indication sent by the AP 2 to the STA that is associated with the AP 2 carries a second minimum width of the CW of the non-key service. The second minimum width is less than the first minimum width in S203. The STA modifies the CWmin of the CW of the non-key service to the second minimum width based on the second modification indication. Therefore, the STA decreases the CWmin of the non-key service, to cancel traffic control on the non-key service. In another implementation, the second modification indication sent by the AP 2 to the STA that is associated with the AP 2 carries a second maximum width of the CW of the non-key service. The second maximum width is less than the first maximum width in S203. The STA modifies the CWmax of the non-key service to the second maximum width based on the second modification indication. Therefore, the STA decreases the CWmax of the non-key service, to cancel traffic control on the non-key service. In actual application, the two implementations provided in this paragraph may be separately used (that is, the second modification indication carries one of the second minimum width and the second maximum width), or may be used in combination (that is, the second modification indication carries the second minimum width and the second maximum width). This is not limited in this embodiment of this application.

In an optional embodiment, corresponding to S203, the AP 2 may further control, in another manner, the STA associated with the AP 2 to cancel traffic control on the non-key service. For example, the AP 2 increases the value of the RWND field in the packet that is of the non-key service and sent to the STA.

In conclusion, according to the congestion control method provided in this embodiment of this application, the AP 1 sends the second indication to the AP 2 after the key service of the AP 1 is recovered, and the AP 2 may cancel traffic control on the non-key service of the AP 2 based on the second indication. Therefore, while the QoS of the key service is improved, the throughput of the non-key service of the AP 2 may also be improved.

The following describes an apparatus embodiment of this application. An apparatus of this application may be configured to perform the congestion control method of this application. For details not disclosed in the apparatus embodiment of this application, refer to the method embodiment of this application.

Figure 5:
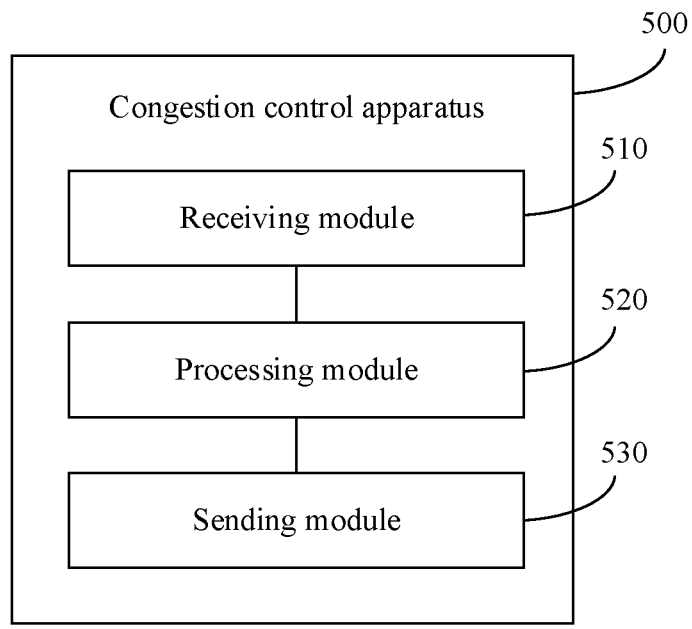
FIG. 5 is a schematic diagram of a structure of a congestion control apparatus according to an embodiment of this application.

FIG. 5 is a schematic diagram of a structure of a congestion control apparatus 500 according to an embodiment of this application. The congestion control apparatus 500 is applied to a first access point. For example, the congestion control apparatus 500 is the first access point or a functional component in the first access point. The first access point may be the AP 2 in the foregoing embodiment. Refer to FIG. 5. The congestion control apparatus 500 includes a receiving module 510 and a processing module 520.

The receiving module 510 is configured to receive a first indication from a second access point, where the second access point is a neighboring access point of the first access point, and an operating channel of the first access point and an operating channel of the second access point overlap. For a function implementation of the receiving module 510, refer to the related description in S202.

The processing module 520 is configured to perform traffic control on a non-key service of the first access point based on the first indication. For a function implementation of the processing module 520, refer to the related description in S203.

Optionally, the processing module 520 is configured to, if the first indication is received and channel utilization of the non-key service of the first access point is higher than a control threshold, perform traffic control on the non-key service of the first access point.

Optionally, still refer to FIG. 5. The congestion control apparatus 500 further includes a sending module 530.

The processing module 520 is configured to invoke the sending module 530 to send a modification indication to a station associated with the first access point, where the modification indication is used to indicate the station to modify an EDCA parameter of the non-key service, so as to perform traffic control on the non-key service.

Optionally, the receiving module 510 is configured to receive a first beacon frame from the second access point, where the first beacon frame carries the first indication.

Optionally, the receiving module 510 is further configured to receive a second indication from the second access point. For a function implementation of the receiving module 510, refer to the related description in S205.

The processing module 520 is further configured to cancel traffic control on the non-key service of the first access point based on the second indication. For a function implementation of the processing module 520, refer to the related description in S206.

Optionally, the receiving module 510 is configured to receive a second beacon frame from the second access point, where the second beacon frame carries the second indication.

Optionally, a distance between the first access point and the second access point is less than a distance threshold.

Optionally, that an operating channel of the first access point and an operating channel of the second access point overlap includes that at least one sub-channel of the operating channel of the first access point is the same as at least one sub-channel of the operating channel of the second access point.

In conclusion, according to the congestion control apparatus provided in this embodiment of this application, the first access point may receive the first indication from the second access point, and perform traffic control on the non-key service of the first access point based on the first indication. Because the operating channel of the first access point and the operating channel of the second access point overlap, after the first access point performs traffic control on the non-key service of the first access point, a service of the second access point and a key service of the first access point can use more channel resources. This helps improve QoS of the service of the second access point and QoS of the key service of the first access point. The first access point and the second access point may be neighboring access points deployed on a same frequency band. In other words, cooperative work of the intra-frequency neighboring access points is implemented in this embodiment of this application. In addition, after the first access point performs traffic control on the non-key service of the first access point, a key service of the second access point may be recovered. After the key service of the second access point is recovered, the first access point may cancel traffic control on the non-key service of the first access point based on the second indication from the second access point. Therefore, a throughput of the non-key service of the first access point may be improved while the QoS of the key service is improved.

Figure 6:
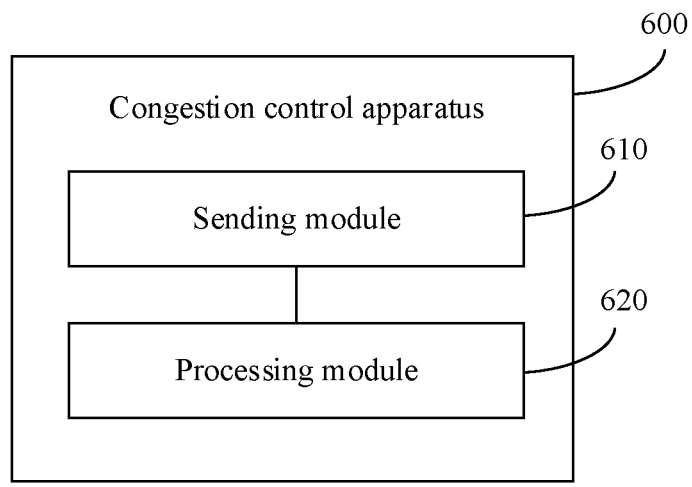
FIG. 6 is a schematic diagram of a structure of another congestion control apparatus according to an embodiment of this application.

FIG. 6 is a schematic diagram of a structure of another congestion control apparatus 600 according to an embodiment of this application. The congestion control apparatus 600 is applied to a first access point. For example, the congestion control apparatus 600 is the first access point or a functional component in the first access point. The first access point may be the AP 1 in the foregoing embodiment. Refer to FIG. 6. The congestion control apparatus 600 includes a sending module 610.

The sending module 610 is configured to send a first indication to a second access point, where the first indication is used to indicate the second access point to perform traffic control on a non-key service of the second access point, the second access point is a neighboring access point of the first access point, and an operating channel of the first access point and an operating channel of the second access point overlap. For a function implementation of the sending module 610, refer to the related description in S201.

Optionally, the sending module 610 is configured to send a first beacon frame to the second access point, where the first beacon frame carries the first indication.

Optionally, the sending module 610 is configured to, if utilization of the operating channel of the first access point is greater than a target threshold and a key service of the first access point is affected, send the first indication to the second access point.

Optionally, the sending module 610 is further configured to send a second indication to the second access point, where the second indication is used to indicate the second access point to cancel traffic control on the non-key service of the second access point. For a function implementation of the sending module 610, refer to the related description in S204.

Optionally, the sending module 610 is configured to send a second beacon frame to the second access point, where the second beacon frame carries the second indication.

Optionally, the sending module 610 is configured to, if the key service of the first access point is recovered, send the second indication to the second access point.

Optionally, the congestion control apparatus 600 further includes a processing module 620, configured to obtain at least one of the first indication and the second indication.

Optionally, a distance between the first access point and the second access point is less than a distance threshold.

Optionally, that an operating channel of the first access point and an operating channel of the second access point overlap includes that at least one sub-channel of the operating channel of the first access point is the same as at least one sub-channel of the operating channel of the second access point.

In conclusion, according to the congestion control apparatus provided in this embodiment of this application, the first access point may send the first indication to the second access point, and the second access point may perform traffic control on the non-key service of the second access point based on the first indication. Because the operating channel of the first access point and the operating channel of the second access point overlap, after the second access point performs traffic control on the non-key service of the second access point, a service of the first access point and a key service of the second access point can use more channel resources. This helps improve QoS of the service of the first access point and QoS of the key service of the second access point. The first access point and the second access point may be neighboring APs deployed on a same frequency band. In other words, cooperative work of the intra-frequency neighboring access points is implemented in this embodiment of this application. In addition, the first access point sends the first indication to the second access point when air interface congestion occurs on the first access point. Therefore, after the second access point performs traffic control on the non-key service of the second access point based on the first indication, air interface congestion on the first access point is relieved. The first access point may send the second indication to the second access point after the key service of the first access point is recovered, and the second access point may cancel traffic control on the non-key service of the second access point based on the second indication. Therefore, a throughput of the non-key service of the second access point may be improved while the QoS of the key service is improved.

An embodiment of this application provides a congestion control apparatus. The congestion control apparatus may be an AP (for example, the AP 1 or the AP 2 in the foregoing embodiments) or a functional component in the AP. The congestion control apparatus includes a processor, a memory, and a transceiver.

The transceiver is configured to perform sending and receiving actions in the congestion control method provided in the foregoing embodiments.

The memory is configured to store a computer program.

The processor is configured to execute the computer program stored in the memory, to perform processing actions in the congestion control method provided in the foregoing embodiments.

Figure 7:
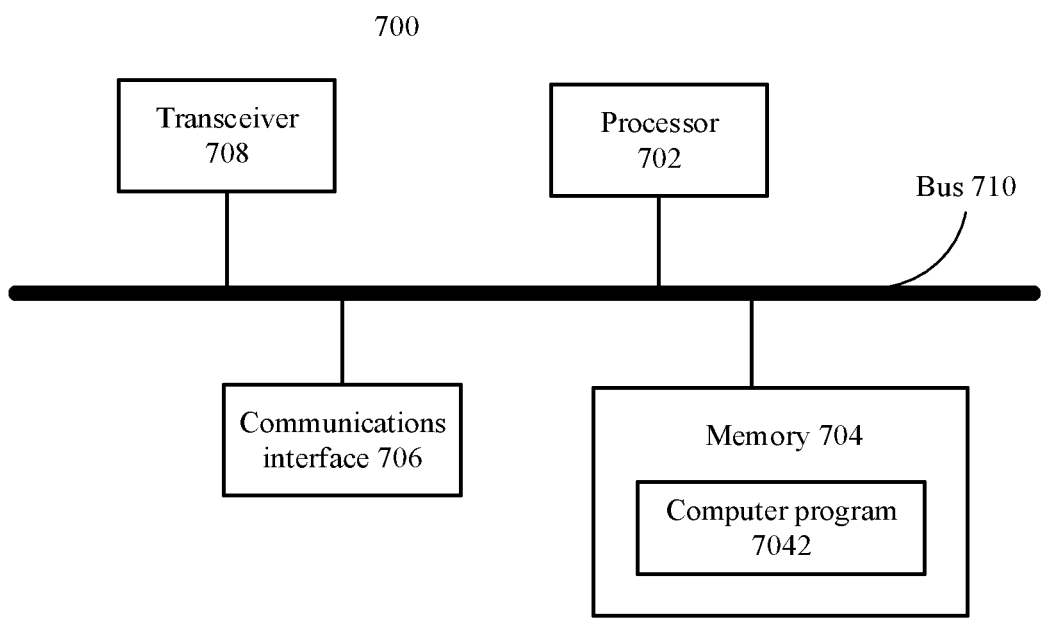
FIG. 7 is a schematic diagram of a structure of still another congestion control apparatus according to an embodiment of this application.

In an example, FIG. 7 is a schematic diagram of a structure of a congestion control apparatus 700 according to an embodiment of this application. The congestion control apparatus 700 includes a processor 702, a memory 704, a communications interface 706, a transceiver 708, and a bus 710. The processor 702, the memory 704, the communications interface 706, and the transceiver 708 are communicatively connected to each other through the bus 710. A connection manner between the processor 702, the memory 704, the communications interface 706, and the transceiver 708 shown in FIG. 7 is merely an example. In an implementation process, the processor 702, the memory 704, the communications interface 706, and the transceiver 708 may be communicatively connected to each other in another connection manner other than the bus 710.

The memory 704 may be configured to store a computer program 7042 (or referred to as program code). The computer program 7042 includes instructions and data. The memory 704 may be various types of storage media, for example, a random-access memory (RAM), a read-only memory (ROM), a non-volatile RAM (NVRAM), a programmable ROM (PROM), an erasable PROM (EPROM), an electrically EPROM (EEPROM), a flash memory, a register, a compact disc (CD) ROM (CD-ROM) or other optical disk storage, optical disc storage (including a compact disc, a laser disc, an optical disc, a DIGITAL VERSATILE DISC (DVD), a BLU-RAY disc, and the like), a disk, or another magnetic storage device.

The processor 702 may be a general-purpose processor. The general-purpose processor may be a processor that performs a step and/or operation by reading and executing a computer program (for example, the computer program 7042) stored in a memory (for example, the memory 704). In a process of performing the foregoing step and/or operation, the general-purpose processor may use the computer program stored in the memory (for example, the memory 704). The stored computer program, for example, may be executed to implement related functions of the processing module 520 and the processing module 620. The general-purpose processor may be, for example, but is not limited to, a central processing unit (CPU). The processor 702 may also be a dedicated processor. The dedicated processor may be a processor specially designed to perform a step and/or operation. The dedicated processor may be, for example, but is not limited to, a digital signal processor (DSP), a network processor (NP), an application-specific integrated circuit (ASIC), a complex programmable logic device (CPLD), a field-programmable gate array (FPGA), generic array logic (GAL), and the like. In addition, the processor 702 may alternatively be a combination of a plurality of processors, that is, a multi-core processor. The processor 702 may include at least one circuit, and may execute the computer program stored in the memory 704, to perform all or some steps of the congestion control method provided in the foregoing embodiments.

The communications interface 706 may include an input/output (I/O) interface, a physical interface, a logical interface, and the like that are configured to implement interconnection between components in the congestion control apparatus 700, and an interface that is configured to implement interconnection between the congestion control apparatus 700 and another device (for example, a network device). The logical interface is an internal interface of the congestion control apparatus 700, and may be configured to implement interconnection between the components in the congestion control apparatus 700. The physical interface may be a gigabit Ethernet (GE) interface, and may be configured to implement interconnection between the congestion control apparatus 700 and another device. The physical interface is configured for communication between the congestion control apparatus 700 and another device, for example, configured for information sending and receiving between the congestion control apparatus 700 and another device. The physical interface may implement the related functions of the receiving module 510, the sending module 530, and the sending module 610.

The transceiver 708 may be a radio frequency transceiver. The transceiver 708 may include a radio frequency unit and an antenna. The transceiver 708 may also be configured for communication between the congestion control apparatus 700 and another device or a communications network, to implement information sending and receiving between the congestion control apparatus 700 and another device. The transceiver 708 may also implement the related functions of the receiving module 510, the sending module 530, and the sending module 610. In some embodiments, the transceiver 708 may be incorporated into a physical interface. In other words, the transceiver 708 may belong to the physical interface.

The bus 710 may be any type of communications bus configured to implement interconnection between the processor 702, the memory 704, the communications interface 706, and the transceiver 708, for example, a system bus.

The foregoing components may be separately disposed on chips that are independent of each other, or at least some or all of the components may be disposed on a same chip. Whether all the components are separately disposed on different chips or integrated and disposed on one or more chips usually depends on a requirement of a product design. This embodiment of this application imposes no limitation on specific implementations of the foregoing components.

The congestion control apparatus 700 shown in FIG. 7 is merely an example. In an implementation process, the congestion control apparatus 700 may further include other components, which are not listed one by one in this specification. The congestion control apparatus 700 shown in FIG. 7 performs traffic control on a non-key service by performing all or some steps of the congestion control method provided in the foregoing embodiments.

Figure 8:
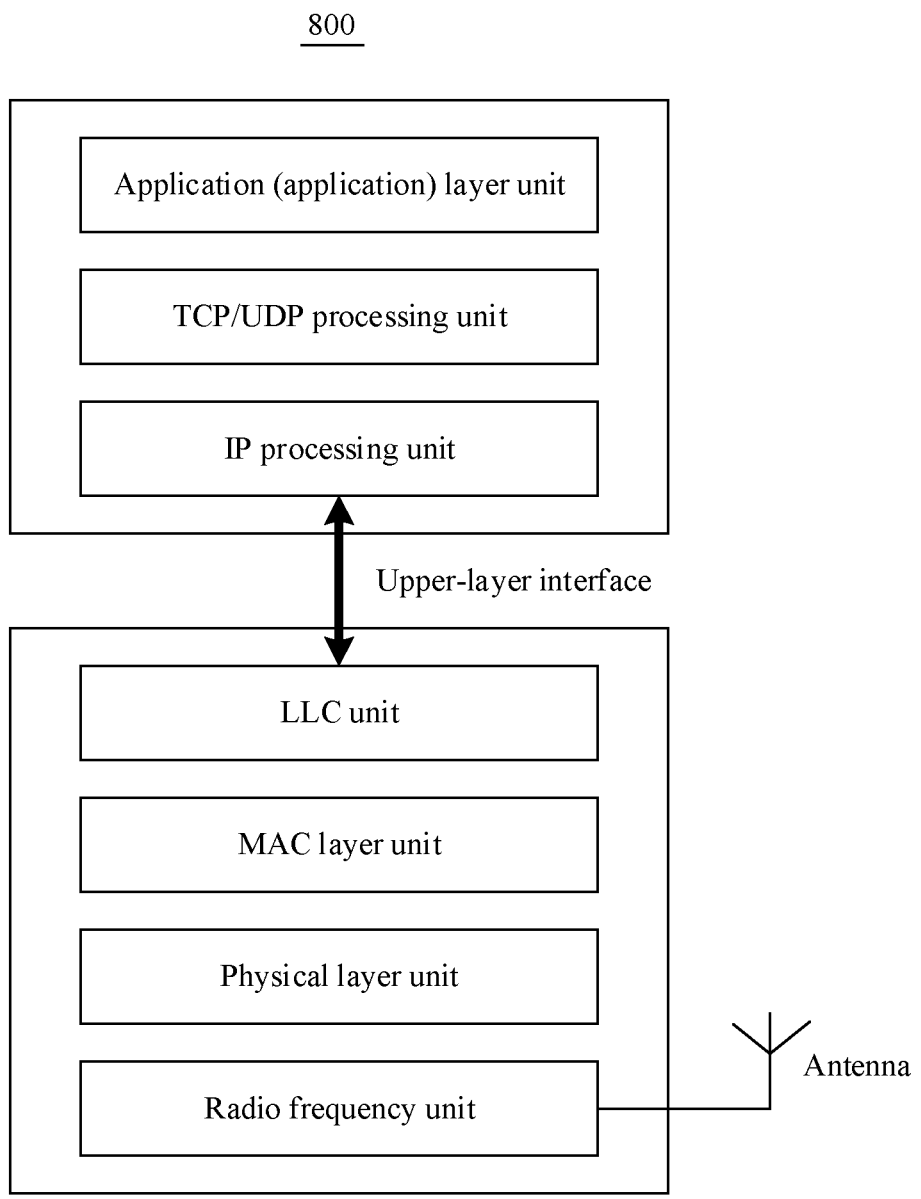
FIG. 8 is a schematic diagram of a structure of yet another congestion control apparatus according to an embodiment of this application.

In another example, FIG. 8 is a schematic diagram of a structure of a congestion control apparatus 800 according to an embodiment of this application. FIG. 8 describes the structure of the congestion control apparatus 800 from a perspective of layers.

As shown in FIG. 8, the congestion control apparatus 800 includes a radio frequency unit, a physical layer (PHY) unit, a MAC layer unit, a logical link control (LLC) unit, an Internet Protocol (IP) processing unit, a Transmission Control Protocol (TCP)/User Datagram Protocol (UDP) processing unit, and an application layer unit from bottom to top. The LLC unit communicates with the IP processing unit through an upper-layer interface. The IP processing unit, the TCP/UDP processing unit, and the application layer unit are also referred to as forwarding layer units.

The congestion control apparatus 800 further includes an antenna. The antenna is connected to the radio frequency unit. The radio frequency unit is configured to process a radio frequency signal received by the antenna. Therefore, in some embodiments, the radio frequency unit is also referred to as a radio unit.

Each of the radio frequency unit, the PHY unit, the MAC layer unit, and the LLC unit may be an independent chip. Alternatively, a plurality of the radio frequency unit, the PHY unit, the MAC layer unit, and the LLC unit may be integrated on a same chip. In this way, each unit may be a part of a processing circuit in the chip. The IP processing unit, the TCP/UDP processing unit, and the application layer unit may be software modules, or may be processing circuits in a processing chip.

The congestion control method provided in this embodiment of this application may be jointly performed by the radio frequency unit, the MAC layer unit, the TCP/UDP processing unit, and the like. For example, in the foregoing method embodiments, a related step of collecting statistics on the QoS of the key service may be performed by the MAC layer unit. Related steps of sending and receiving the indication may be performed by the radio frequency unit and the TCP/UDP processing unit in cooperation. Related steps of performing traffic control on the non-key service may be performed by the MAC layer unit and the TCP/UDP processing unit in cooperation. The PHY unit, the LLC unit, the IP processing unit, the application layer unit, and the like may cooperate with the radio frequency unit, the MAC layer unit, and the TCP/UDP processing unit to perform the congestion control method in embodiments of this application. This is not limited in embodiments of this application.

An embodiment of this application provides a congestion control system, including at least two access points. Operating channels of the at least two access points overlap, and the at least two access points include at least one of an AP 1 or an AP 2 configured to perform the foregoing congestion control method. For example, at least one of the at least two access points includes the congestion control apparatus shown in any one of FIG. 5 to FIG. 7.

In an optional embodiment, the at least two access points further include a second access point, and the second access point is a neighboring access point of a first access point. The first access point is configured to send a first indication to the second access point. The second access point is configured to perform traffic control on a non-key service of the second access point based on the first indication.

For example, the congestion control system may be the wireless communications network shown in FIG. 1.

An embodiment of this application provides a computer-readable storage medium. The computer-readable storage medium stores a computer program. When the computer program is executed (for example, executed by an AP or one or more processors), all or some of the steps of the congestion control method provided in the foregoing method embodiments are implemented.

An embodiment of this application provides a computer program product. The computer program product includes a program or code. When the program or the code is executed (for example, executed by an AP or one or more processors), all or some of the steps of the congestion control method provided in the foregoing method embodiments are implemented.

An embodiment of this application provides a chip, including a programmable logic circuit and/or program instructions. When the chip is running, the chip is configured to implement all or some steps of the congestion control method provided in the foregoing method embodiments.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the term "at least one" means one or more, and "a plurality of" means two or more. The term "at least two" means two or more. In this application, unless otherwise specified, the symbol "I" generally means "or". For example, AB may represent A or B. The term "and/or" in this specification describes only an association relationship for describing associated objects and represents that three relationships may exist. For example, A and/or B may represent the following three cases: only A exists, both A and B exist, and only B exists. In addition, for ease of clear description, in this application, terms such as "first", "second", and "third" are used to distinguish same items or similar items having basically the same functions. A person skilled in the art may understand that the terms such as "first", "second", and "third" do not limit a quantity and an execution sequence.

Different types of embodiments such as the method embodiments and the apparatus embodiments provided in the embodiments of this application may be mutually referred to. This is not limited in the embodiments of this application. A sequence of the operations of the method embodiments provided in the embodiments of this application can be properly adjusted, and operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it should be understood that the disclosed apparatus and the like may be implemented in other composition manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts described as units may or may not be physical units, may be located in one position, or may be distributed on a plurality of devices. Some or all of the units may be selected based on an actual requirement to achieve the objectives of the solutions in embodiments.

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A congestion control method, comprising:
   receiving, from a second access point, a first indication at a first access point, wherein the second access point is a neighboring access point of the first access point, wherein a first operating channel of the first access point and a second operating channel of the second access point overlap, wherein the first operating channel is an operating channel of the first access point, and wherein the second operating channel is an operating channel of the second access point; and
   performing, based on the first indication, traffic control on a non-key service of the first access point, wherein performing the traffic control on the non-key service comprises sending a modification indication to a station associated with the first access point, wherein the modification indication instructs the station to modify an enhanced distributed channel access (EDCA) parameter of the non-key service that reduces channel access probability of the non-key service of the station and increases channel utilization of a key service of the station.

2. The congestion control method of claim 1, wherein performing the traffic control on the non-key service comprises performing the traffic control on the non-key service after receiving the first indication and a channel utilization of the non-key service is greater than a control threshold.

3. The congestion control method of claim 1, wherein receiving the first indication from the second access point further comprises receiving, a first beacon frame from the second access point, wherein the first beacon frame carries the first indication.

4. The congestion control method of claim 1, further comprising:
   receiving, from the second access point, a second indication; and
   canceling, based on the second indication, the traffic control on the non-key service.

5. The congestion control method of claim 4, wherein receiving the second indication further comprises receiving, from the second access point, a second beacon frame, wherein the second beacon frame carries the second indication.

6. The congestion control method of claim 1, wherein a distance between the first access point and the second access point is less than a distance threshold.

7. The congestion control method of claim 1, wherein at least one first sub-channel of the first operating channel is the same as at least one second sub-channel of the second operating channel.

8. A congestion control method, comprising:
sending, from a first access point to a second access point, a first indication instructing the second access point to perform traffic control on a non-key service of a station associated with the second access point, wherein the traffic control is for modifying an enhanced distributed channel access (EDCA) parameter of the non-key service that reduces channel access probability of the non-key service of the station and increases channel utilization of a key service of the station,
wherein the second access point is a neighboring access point of the first access point,
wherein a first operating channel of the first access point and a second operating channel of the second access point overlap,
wherein the first operating channel is an operating channel of the first access point, and
wherein the second operating channel is an operating channel of the second access point.

9. The congestion control method of claim 8, wherein the sending the first indication to the second access point comprises sending a first beacon frame to the second access point, wherein the first beacon frame carries the first indication.

10. The congestion control method of claim 8, wherein sending the first indication to the second access point comprises sending the first indication to the second access point when utilization of the first operating channel is greater than a target threshold and the key service is affected.

11. The congestion control method of claim 8, further comprising further sending, a second indication instructing the second access point to cancel the traffic control on the non-key service.

12. The congestion control method of claim 11, wherein sending the second indication to the second access point further comprises sending a second beacon frame to the second access point, wherein the second beacon frame carries the second indication.

13. The congestion control method of claim 11, further comprising further sending the second indication to the second access point when the key service of the first access point is recovered.

14. The congestion control method of claim 8, wherein a distance between the first access point and the second access point is less than a distance threshold.

15. The congestion control method of claim 8, wherein at least one first sub-channel of the first operating channel is the same as at least one second sub-channel of the second operating channel.

16. A first access point comprising:
a transceiver configured to receive, from a second access point, a first indication, wherein the second access point is a neighboring access point of the first access point, wherein a first operating channel of the first access point and a second operating channel of the second access point overlap, wherein the first operating channel is an operating channel of the first access point, and wherein the second operating channel is an operating channel of the second access point; and
a processor coupled to the transceiver and configured to perform, based on the first indication, traffic control on a non-key service of the first access point, wherein performing the traffic control on the non-key service comprises sending a modification indication to a station associated with the first access point, wherein the modification indication instructs the station to modify an enhanced distributed channel access (EDCA) parameter of the non-key service that reduces channel access probability of the non-key service of the station and increases channel utilization of a key service of the station.

17. The first access point of claim 16, wherein the processor is further configured to further perform the traffic control on the non-key service when a channel utilization of the non-key service is greater than a control threshold.

18. The first access point of claim 16, wherein the transceiver is further configured to receive, from the second access point, a first beacon frame, wherein the first beacon frame carries the first indication.

19. The first access point of claim 16, wherein the transceiver is further configured to receive a second indication from the second access point, and wherein the processor is further configured to cancel the traffic control on the non-key service based on the second indication.

20. The first access point of claim 19, wherein the second indication comprises a second beacon frame, and wherein the second beacon frame carries the second indication.

* * * * *